July 21, 1953  E. N. MICHNA  2,646,160
UNIVERSAL LINK CONVEYER CHAIN
Filed Nov. 7, 1949  2 Sheets-Sheet 1
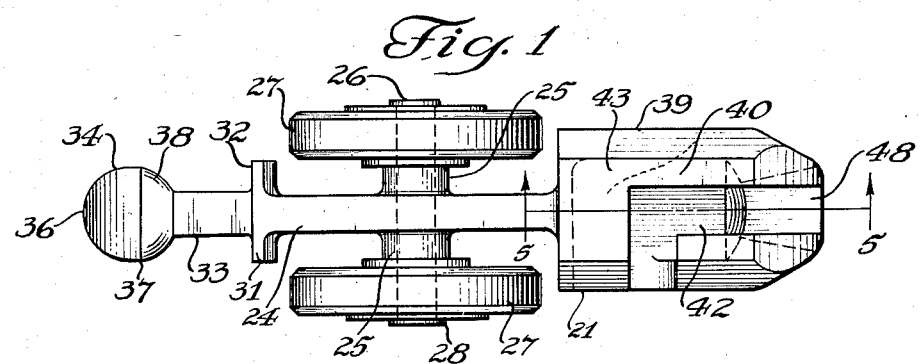
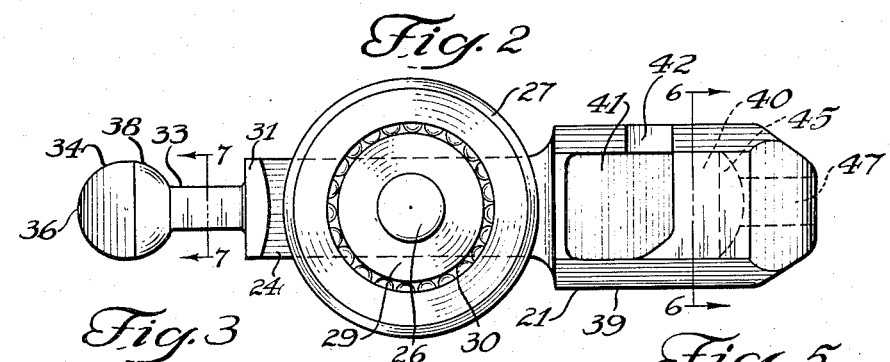
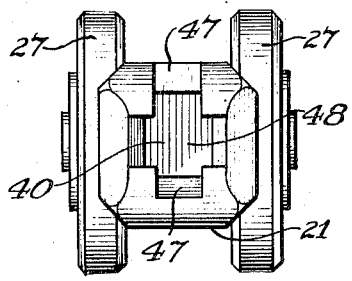
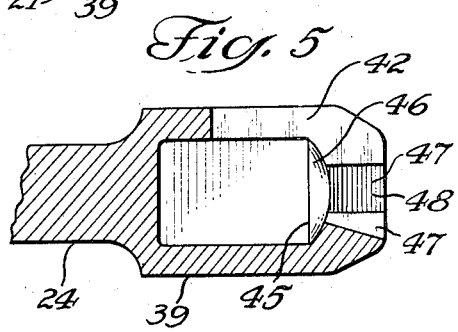
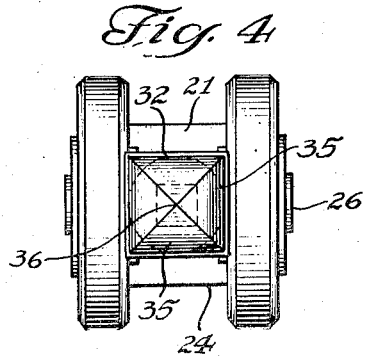
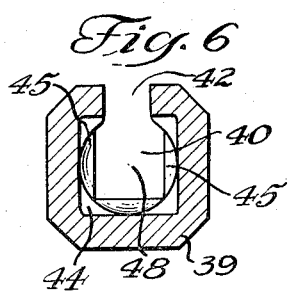
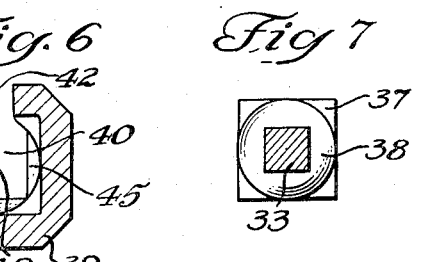
Inventor
Edward N. Michna
By John F. Brezina
Attorney July 21, 1953      E. N. MICHNA      2,646,160
UNIVERSAL LINK CONVEYER CHAIN
Filed Nov. 7, 1949      2 Sheets-Sheet 2
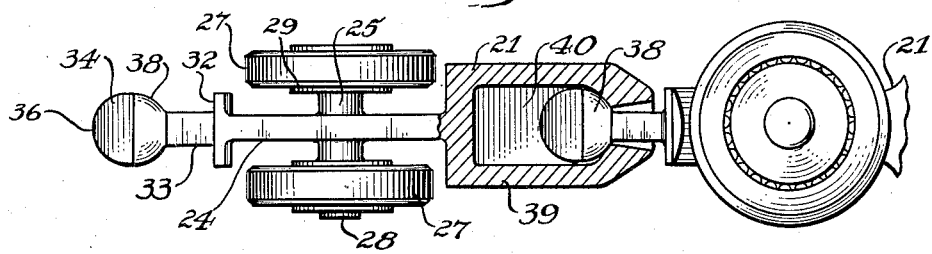
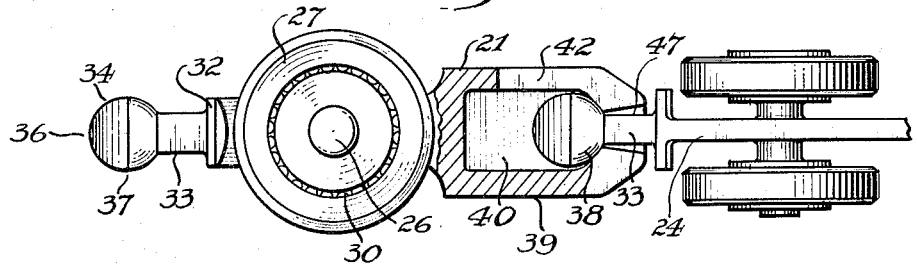
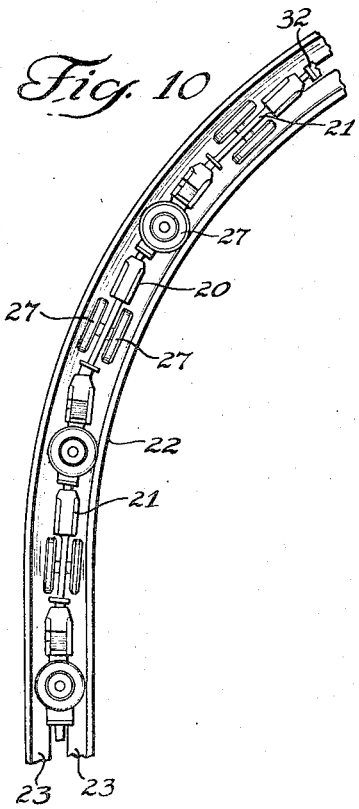
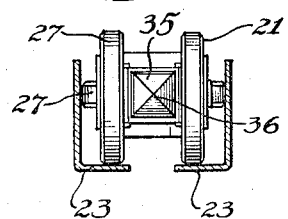
Inventor
Edward N. Michna
By John F. Brezina
Attorney Patented July 21, 1953

2,646,160

UNITED STATES PATENT OFFICE 2,646,160

UNIVERSAL LINK CONVEYER CHAIN

Edward N. Michna, Chicago, Ill.

Application November 7, 1949, Serial No. 125,861

7 Claims. (Cl. 198—189)

1

My invention relates to conveyor chains and more particularly to the novel links which said chains comprise.

Former link chains, utilized for the same purpose which I propose, comprised a plurality of different segments or sections which because of their structure were unable to support great weights. Additionally former links, by virtue of their structure were limited to use of a single wheel or roller to guide the said former links in a track.

It is an object of my invention to overcome the aforesaid difficulties and objections by providing a link chain comprising a plurality of links or couplers each of which is identical with the other. By thus providing identical links, it will easily be understood that the cost of manufacture is greatly reduced.

It is a further object of my invention to provide in a link construction a link member which adapts itself for support by a plurality of wheels or rollers to thereby assure greater life because of the mechanical advantage of a plurality of wheels over one wheel.

Among the objectionable features of former link chains, and which I have overcome, is included the tendency of the prior links or segment of the prior link chains to work apart when used. I have overcome this objection by not relying on pins for locking the links of my novel chain but by providing a coupling head which is locked in a chamber which is of unique structure to permit assembly of the chain but precludes unlocking or disassembly during use.

It is a further object of my invention to provide a link or coupling element in which the component cooperating elements of the link member are cast in a single piece. By casting in a single piece as aforesaid I substantially reduce the cost of manufacture and eliminate the tendency existing in prior links to work apart.

It is a further object of my invention to provide a universal link chain comprising a plurality of standardized identical link members, each of which is provided with a chamber of unique construction in which the coupling head of an adjacent link member is locked during normal use.

Other and further objects of my invention will become apparent from the following description and appended claims, references being made to the accompanying drawings and numerals of reference thereon.

On the drawings:

Fig. 1 is a top plan view of my novel link mem-

2 ber or coupling with certain interior parts indicated in dotted lines.

Fig. 2 is a side elevation of the link illustrated in Fig. 1 with certain interior parts illustrated in dotted lines.

Fig. 3 is an end view of my device looking at the right of Fig. 2.

Fig. 4 is an end view of my device looking at the left of Fig. 2.

Fig. 5 is a sectional view of the link head taken substantially on the line 5—5 of Fig. 1 and looking in the direction of the arrows.

Fig. 6 is a sectional view of the link head taken substantially on the line 6—6 of Fig. 2 and looking in the direction of the arrows.

Fig. 7 is a cross-sectional view taken substantially on the line 7—7 of Fig. 2 and looking in the direction of the arrows.

Fig. 8 is a plan view of a pair of adjacent cooperating link members, parts of the head being broken away for the purpose of illustration.

Fig. 9 is an elevational view of the links illustrated in Fig. 8 and looking at the bottom of Fig. 8, parts being broken away for the purpose of illustration.

Fig. 10 illustrates a universal link chain comprising a plurality of identical standardized units which are illustrated in Figs. 1–9 inclusive.

Fig. 11 is a cross-sectional view through the track illustrated in Fig. 10 and illustrating the relationship of my link on the track.

Referring to the drawings, Fig. 10, it will be noted that the link chain 20 comprises a plurality of standardized identical universal links, link or coupling members 21 which are adapted to ride in a track, rails or guide 22 which may be of the overhead type and which is preferably comprised of a pair of substantially L-shaped channels 23, as illustrated in Fig. 11. I wish it to be understood that I do not intend to be limited to L-shaped channels or tracks or to any other shape of rails or track 22. As illustrated in Fig. 10 it will be noted that each link 21 is connected to an adjacent or identical link 21 and each link may be disposed substantially transversely with respect to each adjacent link. The necessity for such transverse disposition and arrangement of links 21 is to be appreciated when it is realized that tracks such as illustrated at 22 are frequently disposed circuitously and it is therefore necessary to support the link, as indicated, on the curved portion of the track.

Referring more particularly to the novel construction of each universal link 21, it will be seen that numeral 24 designates a longitudinally extending shank or arm having a pair of oppositely and outwardly extending centrally apertured lugs or bosses 25 which are cast integral with the link 21. A pin or shaft 26, illustrated in dotted lines in Fig. 1, and preferably of a suitable bearing material, such as brass, extends transversely through shank or arm 24 and through the apertures in bosses 25 and intermediate the ends of said shank 24. To retain rings or hub members 29, to be hereinafter described, I flare the opposite ends of pin 26 as illustrated at 28 of Fig. 1.

Numeral 29, previously designated, represents a pair of hub members or recessed rings, the recesses not being shown, which are journalled on opposite ends of pin 26 and which are retained from inward or central movement by bosses 25. A wheel 27 is journalled on each of said rings 29. I have found ball bearings 30 to be optionally preferable, said ball bearings being positioned between the respective rings 29 and wheels 27 as illustrated in Figs. 2 and 9 and in the customary and usual manner.

As illustrated in Figs. 1, 2, 8 and 9, numeral 31 designates a pair of oppositely extending lugs or bosses which are cast integral with shank 24 and which provide a preferably flat end face 32 as illustrated clearly in Fig. 10.

An internal arm or bar 33, preferably of greater cross-section than shank 24 and being integral with the link or coupling casting 21 extends longitudinally from the flat face 32 of bosses or lugs 31.

Integral with bar 33 is a head, coupling or joint element 34 which is at one end of bar 33. Said coupling head includes a plurality, preferably four, of curved merging faces 35, as illustrated in Fig. 4, and which terminate in a rounded blunt nose 36. The merging faces extend outwardly from the edges of a flat abutment, base, locking element or face 37 which is illustrated in Fig. 7. A semispherical element or ball portion 38 extends from base 37 in a direction opposite to merging faces 35 and said ball portion is interposed between said base 37 and bar 33 with which elements said ball portion 38 is cast integral. It will be seen that I prefer to have ball portion 38 of smaller diameter than the base 37.

At the end of the shank or arm 24 and opposite the coupling head 34, a head or joint casing 39 is cast integral with link 21. Head 39 is provided with a shaped chamber 40 the space of which communicates with a side opening 41 in a side wall of casing 39, and as illustrated in Fig. 2. As illustrated in Figs. 1 and 2, the space of chamber 40 communicates with an L-shaped slot 42 in casing 39, said slot 42 being continuous with side opening 41. It will be observed that chamber or space 40 is partially enclosed by several casing ledges or shelves 43 which limit the space 40 as illustrated in Fig. 1.

As clearly illustrated in Fig. 6, casing 39, adjacent one end, has an inwardly extending semi-annular flange 44 which presents an inwardly facing flat face 45 and an adjacent integral ball seat element 46 in which the semisphere or ball portion of adjacent link 21 is adapted to seat. A plurality of inwardly opening recesses 47 having tapered floors and being formed in casing 39, taper outwardly from ball seat 45.

Numeral 48 designates an end opening in casing 39. It will be observed that slot 42 is continuous with said opening 48 which also communicates with the space 40.

In the preferred assembly of the link chain, the links 21 are assembled so that each is disposed tranversely with respect to the adjacent links. However, it is to be understood that other disposition of the links can easily be achieved. To assemble the link chain, the head 34 of one link 21 is inserted into chamber 40 of an adjacent link 21 through opening 41 of said one link so that adjacent links 21 are disposed at substantially right angles as illustrated in Fig. 10. The link whose head 34 is in the chamber is then pivoted substantially ninety degrees so that its connecting bar 33 is in alignment with the longitudinally extending portion of slot 42. Head 34 is then drawn through the chamber 40 of the adjacent link until the ball-like element 38 is seated in ball seat 46 whereupon the bar 33 is extended through the slot into a position substantially as illustrated in Figs. 8 and 9.

It will be understood that the dimensions of chamber 40 are such that no substantially independent rotation of the head or joint element 34 will be permitted because of the engagement of base 37 with casing 39 and ledges 43 and face 45 of flange 44.

My novel construction precludes unlocking of the link segments 21 of a conveyor chain during normal use but permits a desirable amount of play between the adjacent universally locked links by providing the outwardly tapering recess 47 which limits the movement of bar 33. Note too that the lugs or bosses 32 limit the amount of play between the adjacent links by being abuttable with the ends of adjacent housings 39, respectively, and thereby prohibit excessive longitudinal play of the links and resulting subsequent unlocking.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a universal roller link for use in conveyor chains and the like comprising an elongated shank; an arm carried on one end of said shank; a coupling element carried on one end of said arm and including a ball-like portion and a locking element; a pair of wheels journalled intermediate said link; a slotted housing carried at the other end of said shank and having side and end openings connected by the slot in said housing, said housing having therein a chamber communicated with said slot and said openings; said housing having an inwardly extending flange and an adjacent ball seat for operatively engaging, respectively, a locking element and a ball-like element of an identical adjacent link; and a boss carried on said link between said arm and said shank for limiting the movement of said link.

2. In a universal metal roller link for use in conveyor chains and the like comprising an elongated shank; rollers journalled on said link; an arm carried on one end of said link; a flat-faced lug intermediate said arm and said shank; a universal coupling element carried at one end of said arm and including a semispherical ball portion and a locking base into which said ball portion merges; a slotted joint housing carried at the other end of said shank, said housing having an end opening and a side opening and a substantially L-shaped slot connecting said openings, said housing having an enlarged space therein communicatively connected with said openings and said slot; a flat-faced inwardly extending flange extending inwardly from said housing and partially limiting said space at one end thereof and being adapted to a locking base of an identical link adjacent said link; a ball seat in said housing and adjacent said flange for a ball portion of a locking element of an identical adjacent link; and a plurality of inwardly opening recesses in the end of said housing to permit movement of an arm of an adjacent link extending through said end opening.

3. In a universal conveyor chain comprising a plurality of substantially identical releasably connected roller links each of which is rotatably disposed substantially 90° about its longitudinal axis with respect to two adjacent links and wherein each of said links is substantially as defined in claim 2, and wherein the coupling element of one of said links is adapted to be releasably maintained in the chamber of an adjacent link, and wherein the boss of one of said links is adapted to engage the end of an adjacent housing, the arm of one of said links extending through the end opening of an adjacent link, and said side openings being adapted to facilitate the assembly of said links by insertion in said side openings of an adjacent coupling element.

4. In a universal conveyor chain comprising a plurality of substantially identical releasably connected roller links each of which is rotatably disposed substantially 90° about its longitudinal axis with respect to two adjacent links and wherein each of said links is substantially as defined in claim 3, and wherein the coupling element of one link is insertable in the side opening of an adjacent link for assembly of said chain, and wherein said lug on each link is adapted to retain said assembled links in locked positions by engagement of an end of said link housing with the lug of an adjacent link to retain said coupling element from substantial sliding in said chamber to thereby preclude unlocking of said links during normal use.

5. A conveyor chain comprising a plurality of interlocked identical link segments each of which is rotatably disposed substantially 90° about its longitudinal axis with respect to two adjacent link segments and in which chain each link segment comprises an elongated shank, roller means mounted on each link segment, a joint housing integral with said shank and being carried at one end thereof, said housing having a side opening, an end opening and a longitudinal slot communicatively connected with said side and end openings, said housing having an enlarged chamber communicatively connected with said housing openings and said slot, an inwardly extending flange integral with said housing and partially enclosing said chamber near one end, said flange including a flat face and an adjacent ball seat, a plurality of inwardly opening recesses in said housing and being tapered outwardly from said ball seat to said end opening; an arm integral with said link segment and extending in a direction substantially opposite to said housing, said arm extending through the end opening in an adjacent link segment and the movement thereof with respect to adjacent link segments being partially limited by the engagement of said arm in the adjacent recesses, a joint element including a ball-like element and a locking element, said ball-like element engaging the ball seat of an adjacent link segment, said locking element preventing substantial rotation of said link segment due to engagement of said locking element by the housing of said adjacent link segment, and a boss extending integral with said arm and said shank and extending outwardly therefrom and engageable with the end of the housing of an adjacent link to thereby retain said joint element from longitudinal movement and unlocking of said link segments.

6. In a universal conveyor chain comprising a plurality of substantially identical releasably connected roller links, each of which is rotatably disposed substantially 90° about its longitudinal axis with respect to two adjacent links; and wherein each of said roller links comprises a longitudinally extending shank; an arm carried by said shank; a coupling element carried by said arm having a ball-like portion and a locking element; and a slotted hollow joint housing carried by said shank defining a chamber for receiving the coupling element of an adjacent link, said housing having a ball seat for operatively engaging the ball-like portion and means for operatively engaging the locking element of the adjacent link to permit pivoting of the adjacent link in a vertical plane and a horizontal plane, but preventing rotation thereof with respect to said housing; said coupling element of each of said links being adapted to be releasably mounted in the chamber of an adjacent link.

7. In a universal link for connection with identical links for use as a conveyor chain; roller means for said links; a shank; and a joint element including an arm at the end of said shank, said joint element further including a semisphere and a flat locking element; a housing carried at the other end of said shank, said housing having a side opening, an end opening and a longitudinal slot communicatively connecting said housing openings, said housing having a space communicatively connected with said slot and said openings and an inwardly extending joint element ball seat and an adjacent flat face, said side opening and slot being adapted to permit connection of said link with an adjacent identical link whereby the semisphere of the joint element of the adjacent link is releasably mounted on said ball seat and said flat face engages the locking element of the adjacent link to permit relative pivoting of said adjacent link in a horizontal plane and a vertical plane, but preventing rotation of said adjacent link about its longitudinal axis with respect to said link.

EDWARD N. MICHNA.

References Cited in the file of this patent

UNITED STATES PATENTS

| Number | Name | Date |
|---|---|---|
| 420,341 | Goodrich | Jan. 28, 1890 |
| 1,861,642 | Paulson | June 7, 1932 |
| 2,009,157 | Zilles et al. | July 23, 1935 |
| 2,065,931 | Alling | Dec. 29, 1936 |
| 2,490,682 | Freeman | Dec. 6, 1949 |